United States Patent [19]

Schwaiger

[11] Patent Number: 4,607,098
[45] Date of Patent: Aug. 19, 1986

[54] BICYCLIC COPPER COMPLEX FORMAZAN COMPOUNDS HAVING A FIBER-REACTIVE GROUP OF THE VINYL SULFONE SERIES, CONTAINING A FIBER-REACTIVE GROUP SUITABLE AS DYESTUFFS

[75] Inventor: Günther Schwaiger, Meckenbeuren, Fed. Rep. of Germany

[73] Assignee: Hoechst Aktiengesellschaft, Fed. Rep. of Germany

[21] Appl. No.: 758,155

[22] Filed: Jul. 24, 1985

Related U.S. Application Data

[63] Continuation of Ser. No. 632,436, Jul. 19, 1984, abandoned.

[51] Int. Cl.$^4$ .................. C09B 50/00; C09B 62/503; C09B 62/515; D06P 1/384
[52] U.S. Cl. ............................. 534/618; 260/505 C; 260/508; 260/510; 534/563; 534/602; 564/251
[58] Field of Search ........................................ 534/618

[56] References Cited

U.S. PATENT DOCUMENTS

| | | | |
|---|---|---|---|
| 3,068,219 | 12/1962 | Beffa et al. | 534/618 |
| 4,336,190 | 6/1982 | Schwaiger et al. | 534/618 |
| 4,370,145 | 1/1983 | Schwaiger et al. | 534/618 |

FOREIGN PATENT DOCUMENTS

| | | | |
|---|---|---|---|
| 0028787 | 5/1981 | European Pat. Off. | 534/618 |
| 0028788 | 5/1981 | European Pat. Off. | 534/618 |
| 2364764 | 7/1974 | Fed. Rep. of Germany | 534/618 |
| 464404 | 12/1968 | Switzerland | 534/618 |
| 464405 | 12/1968 | Switzerland | 534/618 |
| 1194504 | 6/1970 | United Kingdom | 534/618 |
| 1333248 | 10/1973 | United Kingdom | 534/618 |

Primary Examiner—Floyd D. Higel
Attorney, Agent, or Firm—Connolly and Hutz

[57] ABSTRACT

Copper complex formazan compounds useful as dyestuffs and having fiber-reactive dyestuff properties, which are capable of providing fast, deep dyeings and prints on fiber materials, preferably of cellulose and polyamide fibers, have the following structural formula

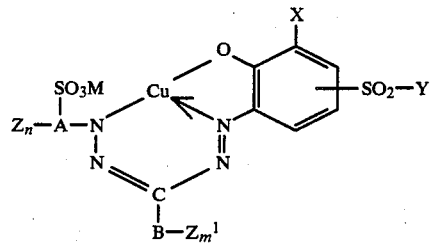

in which m and n are 1 or 2, A is a benzene ring or a naphthalene ring, either of which is necessarily substituted by the sulfo group in the ortho-position relative to the N-atom and which can optionally be further substituted with one to three substituents; B is phenyl or naphthyl, either of which can be substituted or unsubstituted;

M is hydrogen or one equivalent of a metal;

X is hydrogen or sulfo;

Z is hydrogen or a group which confers water-solubility, one or both of which—besides the sulfo group necessarily required in the o-position relative to the N-atom of the hydrazone component A—are bonded to A on an aliphatic or aromatic carbon atom, $Z^1$ is hydrogen or a group which confers water-solubility, one or both of which are bonded to B on an aliphatic or aromatic carbon atom of B, Z and $Z^1$ together denoting not more than three sulfo groups if X is a sulfo group, and Y is the vinyl group or a group of the formula —CH$_2$—CH$_2$—E, in which E represents a substituent which can be removed under alkaline conditions.

20 Claims, No Drawings

BICYCLIC COPPER COMPLEX FORMAZAN COMPOUNDS HAVING A FIBER-REACTIVE GROUP OF THE VINYL SULFONE SERIES, CONTAINING A FIBER-REACTIVE GROUP SUITABLE AS DYESTUFFS

CROSS REFERENCE TO RELATED APPLICATIONS

This application is a continuation of my copending application Ser. No. 632,436, filed July 19, 1984, now abandoned.

The present invention relates to the technical field of metal complex formazan dyestuffs with fiber-reactive properties.

So-called bicylic metal complex formazan dyestuffs which contain a fiber-reactive group of the vinyl sulfone series are already known from British Patent No. 1,194,504; a dyestuff of this type is the compound of the formula

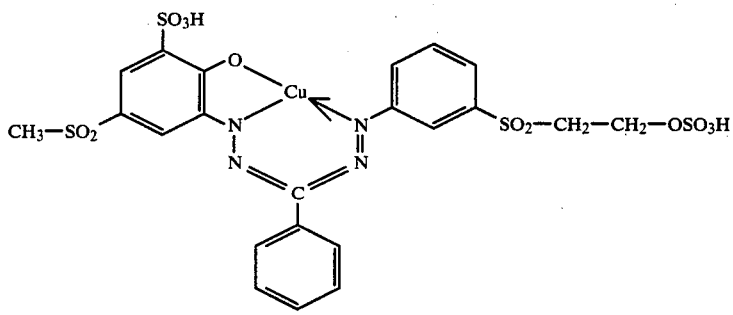

However, these dyestuffs have certain deficiencies in their fastness and technological properties.

Furthermore, so-called tricyclic metal complex formazan dyestuffs which have a fiber-reactive group of the vinyl sulfone series and, for example, 2-carboxy-5-sulfophenylhydrazine as the hydrazone component are known both from the abovementioned British Patent and from U.S. Pat. Nos. 4,336,190 and 4,370,145. Apart from the fact that this hydrazine compound is relatively expensive, these known dyestuffs also still do not exhibit satisfactory technological properties in the two-phase cold pad-batch process or in the pad-airing process, since their speed of fixing is still too low for these dyeing methods.

With the present invention, new copper complex formazan compounds have now been found which have these good technological properties and produce dyeings and prints with very good fastness properties. These new copper complex formazan compounds correspond to the general formula (1)

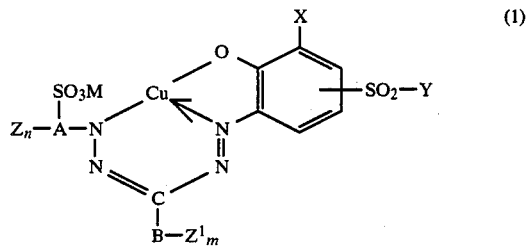

in which:

m and n each are 1 or 2,

A is a benzene ring or a naphthalene ring, both of which are necessarily substituted by the given sulfo group —$SO_3M$ (where M has the meaning given below) in the ortho-position relative to the N-atom of the hydrazone component, and which can be substituted by one to three substituents, preferably two and particularly preferably one substituent, from the group comprising halogen, such as fluorine, chlorine, bromine and iodine, nitro, alkyl having 1 to 5 carbon atoms, such as, in particular, methyl, lower alkylaminoalkyl, such as, in particular, methylaminomethyl, alkoxy having 1 to 4 carbon atoms, such as methoxy and ethoxy, hydroxyl, alkylsulfonyl having 1 to 4 carbon atoms, such as methylsulfonyl and ethylsulfonyl, phenylsulfonyl, sulfamyl, N-mono- and N,N-dialkylsulfamyl with in each case 1 to 4 carbon atoms in the alkyl radical, lower alkanoylamino, such as acetylamino, aroylamino, such as benzoylamino, N-mono- and N,N-dialkylamino with in each case 1 to 4 carbon atoms in the alkyl radical, phenylsulfamyl and phenyl, B is the phenyl radical or a naphthyl radical, both of which can be substituted by substituents, preferably 1 or 2 substituents, from the group comprising hydroxy nitro, halogen, such as fluorine, bromine and chlorine, alkyl having 1 to 5 carbon atoms, preferably methyl and ethyl, alkoxy having 1 to 4 carbon atoms, preferably methoxy and ethoxy, carbalkoxy having 1 to 4 carbon atoms in the alkyl radical, such as carbomethoxy and carbethoxy, amino, N-mono- and N,N-dialkylamino with in each case 1 to 4 carbon atoms in the alkyl radical, and phenylsulfamyl, or B is the radical of a furan, thiophene, pyrrolic, imidazole, pyrazole, pyridine, quinoline or benzimidazole which is optionally substituted by lower alkyl, lower alkoxy, chlorine, benzyl, phenethyl and/or phenyl, or B is a hydrogen atom, or a carboxy, cyano or nitro group, or a straight-chain or branched alkyl group having 1 to 8 carbon atoms, such as the methyl, ethyl, isopropyl, n-butyl, sec.-butyl, tert.-butyl, n-heptyl or n-octyl group, or a straight-chain or branched alkenyl group having 2 to 8 carbon atoms, such as the vinyl or acryl group, it being possible for these alkyl and alkenyl groups to be further substituted by the phenyl radical, which can in turn be substituted by substituents from the group comprising methyl, ethyl, methoxy, ethoxy, fluorine, chlorine, bromine and sulfamyl, M is a hydrogen atom or the equivalent of a metal, preferably an alkali metal or alkaline earth metal, such as, in particular, sodium, potassium, lithium or calcium, X is a hydrogen atom or a sulfo group, Z is a hydrogen atom or a group which confers water-solubility, such as the carboxy or phosphonic acid group, but preferably, as the group which confers water-solubility, a sulfo group, one or both of which—besides the sulfo group necessarily required in the o-position relative to the N atom of the hydrazone component A—are bonded to A on an aliphatic or aromatic carbon atom of A, preferably on an aromatic nucleus, $Z^1$ is a hydrogen atom or a group which confers water-solubility, such as the carboxy or phosphonic acid group, but preferably, as the group which confers water-solubility, a sulfo group, one or both of which are bonded to B on an aliphatic or aromatic carbon atom of B, preferably on an aromatic nucleus, Z and $Z^1$ together denoting not more than three sulfo groups if X is a sulfo group, and Y is the vinyl group or a group of the formula —CH$_2$—CH$_2$—E, in which E is a substituent which can be removed under alkaline conditions.

The groups designated "lower" above and below are groups of which the alkyl radicals are in each case built up from 1 to 4 carbon atoms.

The group E which can be removed under alkaline conditions is, for example, a halogen atom, such as a chlorine or bromine atom, a lower alkanoyloxy group, such as the acetoxy group, an aroyloxy group, such as the benzoyloxy or sulfobenzoyloxy group, an arylsulfonyloxy group, such as the toluyloxy group, a lower dialkylamino group, such as the dimethylamino- or diethylamino-group, a phosphato group (corresponding to the general formula —OPO$_3$M$_2$, where M has the abovementioned meaning), a thiosulfato group (corresponding to the general formula —S—SO$_3$M, where M has the abovementioned meaning) or a sulfato group (corresponding to the general formula —OSO$_3$M, where M has the abovementioned meaning).

Y in the new compounds of the general formula (1) is preferably the vinyl group or, in particular, the β-sulfatoethyl group.

If B is an abovementioned phenyl-substituted alkyl or alkenyl radical, it is preferably the benzyl or styryl radical. Z and $Z^1$ can have identical or different meanings. If two each of Z and $Z^1$ are bonded to the molecule, each can have a different meaning for itself. Also m and n can have different or identical meanings. Compounds of the general formula (1) in which Z is a sulfo group and n is 1 are preferred. If Z or $Z^1$ each are sulfo, m or n is preferably 1.

The novel compounds of the general formula (1) can be in acid form. They are preferably in the form of their salts, in particular the abovementioned alkali metal and alkaline earth metal salts. They are used, preferably in the form of the alkali metal salts, for dyeing (in the general sense, including printing) materials containing hydroxyl groups, amino groups or carboxamide groups.

Preferred compounds of the general formula (1) according to the invention are those copper complex compounds in which A denotes the benzene ring which can be substituted by one substituent from the group comprising chlorine, bromino, nitro, methyl, ethyl, methoxy, ethoxy and carboxyl, B denotes the phenyl radical which can be substituted by 1 or 2 substituents from the group comprising chlorine, methyl, methoxy, ethoxy, carboxyl and nitro, Z has the abovementioned particularly preferred meaning and is preferably bonded to A in the m- or p-position relative to the N-atom of the hydrazone component, $Z^1$ has the abovementioned particularly preferred meaning and is preferably bonded to B in the m- or p-position relative to the carbon atom of the aldehyde component, and Y denotes the vinyl group or, preferably, the β-sulfatoethyl group (of the general formula —CH$_2$—CH$_2$—OSO$_3$M, where M has the abovementioned meaning), the group —SO$_2$—Y being bonded to the benzene nucleus in the metaposition relative to X if X represents a sulfo group or a hydrogen atom, and in the ortho-position relative to X if X represents a hydrogen atom.

Compounds of the formula (1) which are furthermore preferred are those in which A represents the benzene ring, B denotes the phenyl radical, which can be substituted by a methyl, methoxy or ethoxy group or by a chlorine atom, Z represents 1 sulfo group, $Z^1$ is a hydrogen atom or 1 sulfo group and M and Y have the abovementioned particularly preferred meanings.

Particularly preferred copper complex formazan compounds according to the invention are those of the following formulae (1a) and (1b)

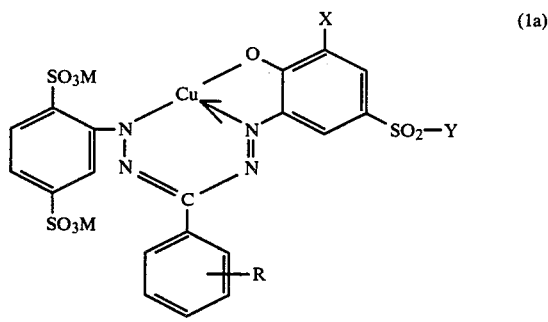

(1a)

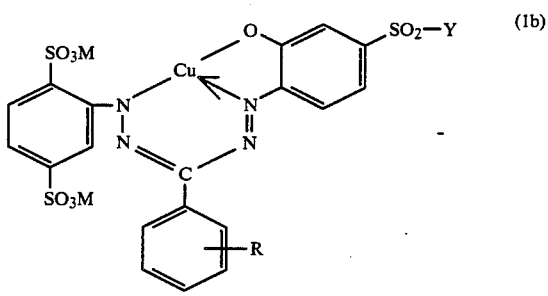

(1b)

in which M has the abovementioned particularly preferred meaning, X represents a hydrogen atom or a sulfo group, Y is the vinyl group or, preferably, the β-sulfatoethyl group and R denotes a hydrogen atom or a methyl, ethyl, methoxy or ethoxy group, or a chlorine atom or a sulfo group; R is preferably bonded in the p-position on the benzene nucleus and, if R is sulfo, again preferably in the m-position.

Compounds which are furthermore preferred are those of the general formulae (1c) and (1d)

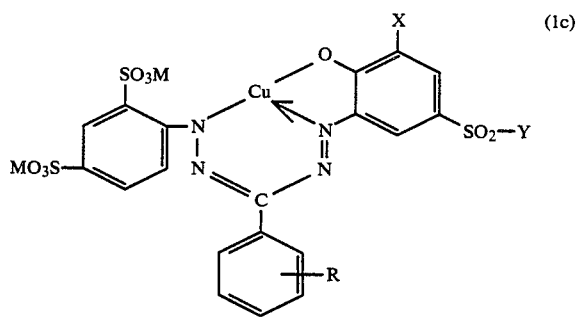

(1c)

-continued

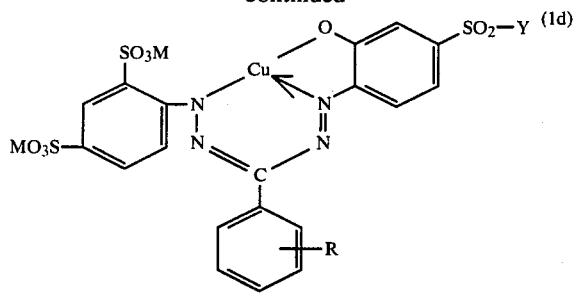

in which M, R, X and Y have the meanings given for the formulae (1a) and (1b).

Compounds of the general formulae (1e) and (1f)

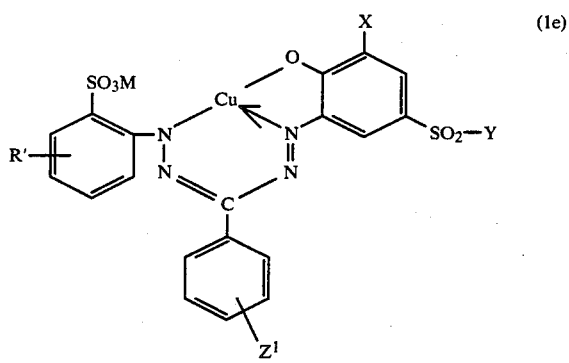

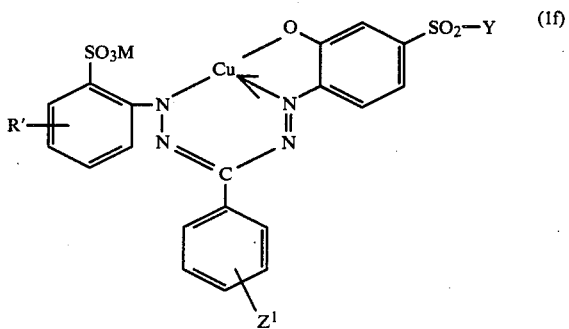

in which M, X and Y have the meanings given for formulae (1a) and (1b), R' represents a hydrogen atom, a chlorine atom or a methyl, ethyl, methoxy or ethoxy group and $Z^1$ is a hydrogen atom or a sulfo group bonded in the p- or m-position, may likewise be singled out.

The present invention furthermore relates to a process for the preparation of the abovementioned, defined compounds of the general formula (1), which comprises reacting an aromatic hydrazone compound of the general formula (2)

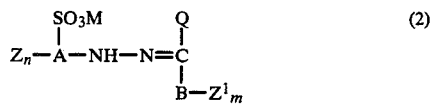

in which A, B, M, Z, $Z^1$, m and n are defined as above and Q denotes hydrogen or a substituent which can be replaced by azo coupling, for example the formyl group or the optionally modified carboxyl group, such as the cyano group or a carbalkoxy or carboxamide group, with the diazonium compound of an aromatic amine of the general formula (3)

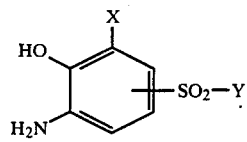

in which X and Y have the abovementioned meanings, and with a copper-donating agent, the components being chosen such that Z and $Z^1$ fulfill the abovementioned conditions in relation to X.

The process according to the invention can be carried out by the customary procedure, analogous to that known for the preparation of metal complex formazan dyestuffs. The process according to the invention is preferably carried out at a pH value between 4 and 7, in particular between 5 and 6, and at a temperature between about 0° C. and 80° C.

The reaction components can be added as desired, but, in the pH range between about 4 and about 6, the coupling reaction proceeds only in the presence of copper ions, as a three-component reaction.

Examples of suitable copper-donating compounds are the simple and complex salts of copper, such as, for example, copper sulfate, copper chloride, copper acetate and copper carbonate and the copper salts of salicylic acid or tartaric acid. If copper salts of mineral acids are used, the reaction is advantageously carried out in the presence of an acid-buffering agent, such as, for example, an alkali metal hydroxide or carbonate or an alkali metal salt of a lower alkanecarboxylic acid, such as acetic acid, or a basic alkali metal salt of phosphoric acid. Such alkali metal compounds are, in particular, the sodium and potassium compounds, preferably, for example, sodium hydroxide, potassium hydroxide, sodium or potassium carbonate, sodium bicarbonate, sodium acetate, disodium hydrogen phosphate and trisodium phosphate.

The copper-donating agent is used in equimolar amounts, so that one heavy metal atom is present per molecule of the compound of the formula (1) to be formed. The metallization usually already goes to completion at room temperature (15° to 25° C.); however, slight warming, for example up to 60° to 80° C., is frequently advantageous.

A procedure for the preparation of the copper complex formazan compounds of the general formula (1) is, for example, the following: the hydrazone compound of the general formula (2) is dissolved in water, using an alkali, such as sodium hydroxide solution or sodium carbonate, at room temperature and the pH value is preferably kept at 6 to 7. The diazonium salt solution of the amine of the formula (3) is then added, during which the pH value of the reaction solution is allowed to become neither alkaline nor too strongly acid, so that, on the one hand, for example, the sulfatoethylsulfonyl group is not damaged under alkaline conditions and, on the other hand, precipitation of the hydrazone and hence a heterogeneous reaction in the acid medium is avoided. The reaction is preferably carried out at a pH value between 4 and 7, in particular 5 and 7. However, it is also possible to add the hydrazone, in dissolved or undissolved form, to the still slightly acid (pH=3–4) diazo solution. Expediently, the reaction temperature should as far as possible initially not exceed 15° C., advantageously 10° C.

The third component, i.e. the copper-donating agent, is added in an equimolar amount at the same time as the diazo component or, preferably, after the diazo component; It may be for example, copper sulfate, as a solid or as an aqueous solution. The coppering reaction is also advantageously carried out at a pH value of 4 to 7, in particular 4 to 6. The metallization and coupling reactions proceed simultaneously side by side. The metallization reaction proceeds relatively rapidly. As mentioned above, before isolation of the copper complex formazan compound prepared, it is advantageous to warm the reaction mixture, for example to 40°–60° C. or even up to about 80° C., in order to accelerate the coupling and metallization or to carry out these reactions quantitatively.

The mixture is then brought to a pH value of 5 to 6 and the copper complex formazan compound according to the invention which has been prepared is isolated in the customary manner, for example by salting out by means of an electrolyte, such as sodium chloride or potassium chloride. If appropriate, the compound can also be isolated by evaporating the solution, such as, for example, by spray-drying.

The compounds according to the invention where Y is the vinyl group can also be prepared, in the manner according to the invention, by, for example, treating a copper complex formazan compound of the formula (1) containing the β-sulfatoethylsulfonyl group in a manner which is customary per se for this reaction, in aqueous-alkaline solution at a pH value between 8 and 10, for example by means of sodium hydroxide solution or sodium carbonate, and at elevated temperature, for example about 40° to 60° C.

The β-thiosulfatoethylsulfonyl compounds of the general formula (1) according to the invention can also be prepared in the manner according to the invention by reacting a vinylsulfonyl compound according to the invention with a salt of thiosulfuric acid, such as, for example, sodium thiosulfate—advantageously in an excess, preferably of 20 to 40 mol %, of the thiosulfate—in aqueous, weakly acid solution, advantageously at a pH value between 5 and 6.8, in particular 5.7 and 6.2, and at elevated temperature, such as, for example, 30 to 80° C., in particular 60° to 75° C.

Another process variant according to the invention for the preparation of compounds of the general formula (1), where E is an ester group, according to the abovementioned procedure with the starting compounds of the general formula (2) and (3) and the copper-donating agent comprises using an aminophenol in which the group —SO₂—Y is a —hydroxyethylsulfonyl group as the starting compound of the general formula (3). In this process variant according to the invention, the reaction to give the copper complex formazan compounds corresponding to the general formula (1) in which Y is initially the hydroxyethyl group can be carried out at a pH value between 4 and 14, it being possible for the coupling reaction itself to be carried out initially at a pH value between 10 and 13, preferably at about 12, and for the coppering reaction to be carried out in the presence of complexing agents, such as tartaric acid or citric acid, at a pH value between about 8 and 14. According to the invention, the β-hydroxyethylsulfonyl/copper complex formazan compound thus prepared can then be converted by esterification in a manner which is customary and known per se into a compound of the general formula (1) in which Y denotes an esterified ethyl group, such as, for example, a β-sulfato-, phosphato-, aroyloxy- or alkanoyloxy-ethyl group. The esterification to the sulfato compound is preferably carried out by means of a sulfating agent, such as, preferably, amidosulfonic acid or chlorosulfonic acid in the presence of pyridine.

The hydrazone compounds of the general formula (2) used as starting compounds are obtained from the corresponding phenyl- and naphthyl-hydrazines of the general formula (4)

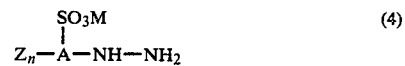

(where A, M, Z and n are defined as above)—which can in turn be prepared in a manner which is customary and known per se, for example from the corresponding diazonium compounds with salts of sulfurous acid, with hydrolysis of the intermediate N-sulfonic acids by means of mineral acids—if appropriate also without intermediate isolation of these hydrazines, by reaction with an aldehyde of the general formula (5)

(where $Z^1$, B, Q and m are defined as above) a pH value between 4 and 8, preferably 5 and 6.

Hydrazone compounds of the general formula (2) where Q is the detachable group mentioned are also obtained in a manner which is customary per se when a methine or methylene compound which can be coupled in two positions and which contains the structural unit of the radical of the formula $Z_n^1$-B- is coupled with the diazonium compound of an amine of the general formula (6)

(where A, M, Z and n are defined as above). Suitable methylene or methine compounds which can be coupled in two positions and which, after coupling has been carried out, still contain an optionally modified carboxyl group on the methine carbon are, for example, diethyl malonate and, preferably, for example, phenylformylacetic acid alkyl esters, such as ethyl phenylformylacetate or the corresponding nitrile, and furthermore chlorophenylformylacetic acid alkyl esters, benzylformylacetic acid alkyl esters, phenylcyanoacetic acid, phenylcyanoacetic acid alkyl esters, phenylacetamide, α-phenyl-acetoacetic acid alkyl esters, α-phenylacetoacetonitrile or naphthylformylacetic acid alkyl esters.

Examples of aromatic amines of the general formula (6) are aniline-2-sulfonic acid, aniline-2,4-disulfonic acid, aniline-2,5-disulfonic acid, 5- and 4-methylaniline-2-sulfonic acid, 2,4-dimethylaniline-6-sulfonic acid, 4,5-dimethylaniline-2-sulfonic acid, 2-methylaniline-4,6-disulfonic acid, 4-methylaniline-2,5-disulfonic acid, 4- and 5-methoxyaniline-2-sulfonic acid, 4-methoxy-5-chloroaniline-2-sulfonic acid, 4,5-dimethoxyaniline-2-sulfonic acid, 4- and 5-ethoxyaniline-2-sulfonic acid, 4- and 5-hydroxyaniline-2-sulfonic acid, 5-hydroxyaniline2,4-disulfonic acid, 4- and 5-carboxyaniline-2-sulfonic acid, 4-hydroxy-3-carboxyaniline-2-sulfonic acid, 4- and 5-nitroaniline-2-sulfonic acid, 2,4-dinitroaniline-6-sulfonic acid, 5-nitro-4-chloroaniline-2-sulfonic acid, 4-fluoroaniline-2-sulfonic acid, 3-, 4- and 5-chloroaniline2-sulfonic acid, 4,5-dichloroaniline-2-sulfonic acid, 2,4-dichloroaniline-6-sulfonic acid, 2,4,5-trichloroaniline2-sulfonic acid, 4-chlorine-5-carboxyaniline-2-sulfonic acid, 2,5-dichloro-4-nitroaniline-6-sulfonic acid, 4- and 5-bromoaniline-2-sulfonic acid, 2,4- and 3,4-dibromoaniline-6-sulfonic acid, 4- and 5-iodoaniline-2-sulfonic acid, 4- and 5-acetaminoaniline-2-sulfonic acid, 1,4-phenylenediamine-2,5-disulfonic acid, 1,3-phenylenediamine-4,6-disulfonic acid, 1-naphthylamine-2-sulfonic acid, 2-naphthylamine-1-sulfonic acid, 1-naphthylamine-2,4-disulfonic acid, 1-naphthylamine-2,5-disulfonic acid, 2-naphthylamine-1,5-disulfonic acid, 2-naphthylamine-1,7-disulfonic acid, 2-naphthylamine-3,6-disulfonic acid, 2-naphthylamine-3,7-disulfonic acid, 1-naphthylamine-2,4,7-trisulfonic acid, 2-naphthylamine-3,6,8-trisulfonic acid and 2-naphthylamine-1,5,7-trisulfonic acid.

Examples of aldehydes corresponding to the general formula (5) are benzaldehyde, 2-, 3- or 4-methylbenzaldehyde, 4-methyl-benzaldehyde-3-sulfonic acid, 2-, 3- or 4-methoxy-benzaldehyde, 4-methoxy-3-chlorobenzaldehyde, 2-, 3- or 4-nitro-benzaldehyde, 2-, 3- or 4-hydroxy-benzaldehyde, 2-, 3- or 4-chloro-benzaldehyde, 2,4-dichloro-benzaldehyde, 2-chloro-benzaldehyde-5-sulfonic acid, 4-chloro-benzaldehyde-2-sulfonic acid, benzaldehyde-2-sulfonic acid, benzaldehyde-3-sulfonic acid, benzaldehyde-4-sulfonic acid, benzaldehyde-2,4-disulfonic acid, 1-naphthaldehyde, 2-naphthaldehyde, furan-2-aldehyde, thiophene-2-aldehyde, pyrrole-2-aldehyde, imidazole-2-aldehyde, pyrazole-5-aldehyde, pyridine-2-aldehyde, pyridine-3-aldehyde, pyridine-4-aldehyde, pyrimidine-5-aldehyde, quinoline-4-aldehyde, benzimidazole-2-aldehyde, formaldehyde, acetaldehyde, propionaldehyde, n-butylaldehyde, oenanthaldehyde, acrylaldehyde, crotonaldehyde, phenacetaldehyde, cinnamaldehyde and vanillin.

Examples of readily accessible and preferred diazo components of the general formula (3) are 4$\beta$-sulfatoethylsulfonyl-2-aminophenol, 5$\beta$-sulfatoethylsulfonyl-2-aminophenol, 4-$\beta$-sulfatoethylsulfonyl-2-aminophenol-6-sulfonic acid and vinylsulfonyl and $\beta$-thiosulfatoethylsulfonyl derivatives thereof, such as, for example, 4-$\beta$vinylsulfonyl-2-aminophenol-6-sulfonic acid and 4-$\beta$-thiosulfatoethylsulfonyl-2-aminophenol-6-sulfonic acid.

The copper complex formazan compounds according to the invention have useful dyestuff properties. They are preferably used for dyeing (in the general sense) materials containing hydroxy, amino and/or carboxamide groups, for example in the form of sheet-like structures, such as paper and leather, or in bulk, such as polyamide and polyurethane, and especially such materials in fiber form.

The present invention accordingly also relates to the use of the compounds of the general formula (1) for dyeing (including bulk dyeing and printing) these materials and to processes for dyeing such materials by procedures which are customary per se, in which a compound of the general formula (1) is used as the coloring agent. The materials are preferably used in the form of fiber materials, especially in the form of textile fibers.

Materials containing hydroxy groups are natural or synthetic materials containing hydroxy groups, such as, for example, cellulose fiber materials or regenerated products thereof and polyvinyl alcohols. Cellulose fiber materials are preferably cotton, but also other vegetable fibers, such as linen, hemp, jute and ramie fibers; examples of regenerated cellulose fibers are viscose staple and viscose rayon.

Examples of materials containing carboxamide groups are synthetic and natural polyamides and polyurethanes, in particular in the form of fibers, for example wool and other animal hair, silk, leather, polyamide-6,6, polyamide-6, polyamide-11 and polyamide-4.

The compounds according to the invention can be applied to and fixed on the substrates mentioned, in particular on the fiber materials mentioned, by the application techniques known for water-soluble dyestuffs, in particular for fiber-reactive dyestuffs.

Thus, using these compounds, very good color yields are obtained on cellulose fibers by the exhaustion process from a long liquor using the most diverse acid-binding agents and, if appropriate, neutral salts, such as, for example, sodium chloride or sodium sulfate. Dyeing is carried out at temperatures between 40° and 100° C., if appropriate at temperatures up to 120° C. under pressure, if appropriate in the presence of customary dyeing auxiliaries, in an aqueous bath. The procedure can be such that the material is introduced into the warm bath and the bath is gradually warmed up to the desired dyeing temperature and the dyeing process is brought to completion at this temperature. If desired, the neutral salts, which accelerate exhaustion of the dyestuff, can also be added to the bath only after the actual dyeing temperature has been reached.

Excellent color yields are likewise obtained on cellulose fibers by the padding process, it being possible to fix the dyestuff in the customary manner by batching at room temperature or elevated temperature, for example up to about 60° C., by steaming or with dry heat.

Deep prints with a good sharpness of contours and a clear white ground are likewise obtained by the customary printing processes for cellulose fibers. The printing result depends only little on varying fixing conditions. The printing processes can be one-phase processes, in which the material is printed with a printing paste containing, for example, sodium bicarbonate, or another acid-binding agent, and the compound according to the invention, and the compound according to the invention is fixed on the fiber by subsequent steaming at 101 to 103° C., or two-phase processes, in which the material is printed, for example, with a neutral or weakly acid printing paste containing the compound according to the invention, and the compound according to the invention is then fixed on the material by passing the printed material through a hot electrolyte-containing alkaline bath or by over-padding with an alkaline electrolyte-containing padding liquor and subsequent batching of this overpadded material or subsequent steaming or subsequent treatment with dry heat. The degrees of fixing obtained with the compounds according to the invention are high in the case both of dyeing and of printing.

For fixing by means of dry heat by the customary thermofixing processes, hot air of 120° to 200° C. is used. Besides customary steam of 101° to 103° C., it is also possible to use superheated steam and pressurized steam with temperatures up to 160° C.

Examples of acid-binding agents which effect fixing of the dyestuffs onto the cellulose fibers are watersoluble basic salts of alkali metals and also alkaline earth metals of inorganic or organic acids, or compounds which liberate an alkali under the action of heat. The alkali metal hydroxides and alkali metal salts of weak to moderate strength inorganic or organic acids may be mentioned in particular, alkali metal compounds meaning preferably the sodium and potassium compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass and trisodium phosphate.

The compounds (dyestuffs) according to the invention are chemically bonded to the fiber by the treatment of the compounds according to the invention with the acid-binding agents, if appropriate under the action of heat; cellulose dyeings in particular exhibit excellent wet fastness properties after the subsequent after-treatment by rinsing to remove non-fixed portions of dyestuff.

As regards the coloristic properties of the compounds according to the invention, it is to be particularly emphasized that they are distinguished by a good stability in printing pastes and padding liquors, also in the presence of alkali, by a very good affinity from a long liquor, by a good build-up and a high speed of fixing by the customary dyeing and printing processes, especially at low temperatures (i.e. room temperature and up to 50° C.), by a uniform depth of color in the dyeing of cotton and regenerated cellulose fibers, by perfect levelness of the dyeings and prints produced with them, and also by a uniform dyeing result from a long liquor when various amounts of electrolytes are added.

Dyeings on polyurethane fibers and polyamide fibers are usually produced from an acid medium. Thus, for example, acetic acid and/or ammonium sulfate or acetic acid and ammonium acetate or sodium acetate can be added to the dyebath in order to obtain the desired pH value. For the purpose of achieving a useful levelness of the dyeing, it is advisable to add the customary leveling auxiliaries, such as, for example, those based on a reaction product of cyanuric chloride with three times the molar amount of an aminobenzenesulfonic acid and/or an aminonaphthalenesulfonic acid, or based on a reaction product of, for example, stearylamine with ethylene oxide. As a rule, the material to be dyed is introduced into the initially weakly alkaline bath at a temperature of about 40° C. and is agitated therein for some time, the dyebath is then brought to a weakly acid, preferably a weakly acetic acid, pH value and the actual dyeing is carried out at a temperature between 60° and 98° C. However, the dyeings can also be produced at the boiling point or at temperatures up to 120° C. (under pressure). After-treatment in an ammoniacal bath can then be carried out.

The dyeings and prints produced with the compounds according to the invention are distinguished by very pure, predominantly blue color shades. In particular, the dyeings and prints on cellulose fiber materials have, as already mentioned, a good depth of color, as well as very good fastness to light, good fastness to light when wet and in the presence of perspiration, good fastness to hypochlorite bleaching and to chlorinated water, very good fastness to ironing, cross-dyeing and rubbing and other excellent wet fastness properties, such as fastness to washing, milling, alkali, acid and perspiration. Non-fixed portions of dyestuff can easily be completely washed out of the fiber material again, which is an essential precondition for good wet fastness properties of the dyeing to be obtained. Moreover, the dyeings are stable towards the customary synthetic resin finishes. Some of the compounds (dyestuffs) according to the invention are comparable to reactive dyestuffs of the anthraquinone series in their purity of color shade and the important fastness properties.

The examples below serve to illustrate the invention. Parts mentioned therein are parts by weight and the percentage data are percentages by weight, unless indicated otherwise. Parts by weight bear the same relationship to parts by volume as that of the kilogram to the liter.

The compounds described by their formulae in the examples are given in the form of the free acids; in general, they are prepared and isolated in the form of their sodium or potassium salts and are used for dyeing in the form of their salts. The starting compounds and components mentioned in the form of the free acid in the following examples, especially in the tabular examples, can likewise be used in the synthesis as such or in the form of their salts, preferably their alkali metal salts, such as the sodium and potassium salts.

The absorption maxima ($\lambda_{max}$) of the compounds according to the invention were determined in aqueous solution.

Example 1

35.6 parts of the hydrazone from phenylhydrazine-2,5-disulfonic acid and benzaldehyde are suspended in 200 parts of water at 20° to 25° C. and are dissolved at a pH value of 6.5 to 7 by addition of an aqueous sodium hydroxide solution. The aqueous diazonium salt solution of 4-β-sulfatoethylsulfonyl-2-aminophenol-6-sulfonic acid which has been obtained by customary diazotization of 37.7 parts of this aminophenol in aqueous solution is added to this solution at a temperature of 5° to 15° C., and 100 parts by volume of aqueous 1 molar copper sulfate solution are then added dropwise at 10° to 15° C. in the course of 15 minutes, the pH value being kept between 4.0 and 6.5 with a total of 18 parts of sodium carbonate. The reaction mixture is subsequently stirred for 1 hour at room temperature until the coupling reaction has ended and is then heated up to 40°–50° C., this solution is stirred for a further hour and then clarified with kieselguhr and the copper complex formazan compound formed is precipitated by means of sodium chloride, filtered off, washed with dilute aqueous sodium chloride solution and dried at 60° to 80° C.

A dark, electrolyte-containing powder of the alkali metal salt (sodium salt) of the compound corresponding to the general formula (1 g)

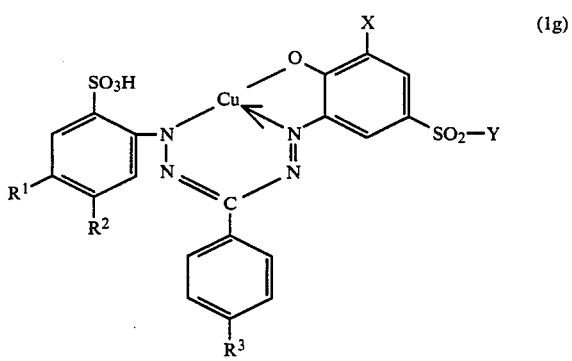

in which $R^2$ denotes a sulfo group, $R^1$ and $R^3$ each denote a hydrogen atom, X denotes a sulfo group and Y denotes the β-sulfatoethyl group, is obtained, this powder dissolving in water giving a dark blue-colored solution ($\lambda_{max}=598$ nm). This compound is particularly suitable as a dyestuff and dyes cotton and regenerated cellulose fibers in pure blue color shades with a high rate of fixing from a long liquor and, in particular, by the two-phase cold pad-batch process in the presence of an acid-binding agent. The dyeings, which are after-treated in the customary manner after soaping for 10 minutes and rinsing with water, are found to be very fast to light and wet processing. Of the wet fastness properties, fastness to washing, milling and perspiration, fastness to light when wet and in the presence of perspiration and the good stability of prints towards acid hydrolysis may be emphasized in particular.

EXAMPLE 2

The corresponding phenylhydrazone is prepared from 26.8 parts of phenylhydrazine-2,5-disulfonic acid and 11 parts of benzaldehyde in 200 parts of water at 20° to 60° C., preferably 40°–55° C., and at a pH Value between 4 and 7, preferably 6, and is then dissolved at a pH value of 6.5 to 7 with aqueous sodium hydroxide solution. The aqueous, weakly acid (with a pH value of 3 to 4) diazonium salt solution of the diazonium salt obtained by customary diazotization of 29.7 parts of 5β-sulfatoethylsulfonyl-2-aminophenol and, at the same time, 100 parts by volume of aqueous 1 molar copper sulfate solution (the diazonium salt solution and the copper sulfate solution can also be combined beforehand) are then allowed to run into this solution in the course of 10 to 20 minutes, with stirring, during which the temperature is kept between about 5° and 20° C., preferably at 10° to 15° C., and the pH value is kept at 4.5 to 6.5 with about 19 parts of sodium carbonate. This reaction mixture is stirred for about a further hour at about 15 to 25° C.; it is then heated up to 30° to 50° C., stirring is continued until the coupling reaction has ended and the mixture is then clarified with kieselguhr.

The copper complex formazan compound formed is precipitated with sodium chloride at a pH value of 5.5, filtered off, washed with dilute aqueous sodium chloride solution and dried thoroughly at 80° C.

A dark powder is obtained, which contains the alkali metal salt (sodium salt) of the compound of the formula

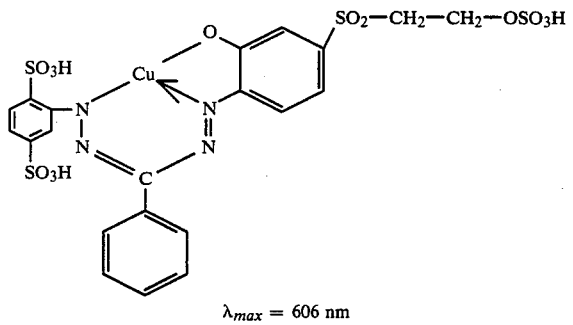

$\lambda_{max} = 606$ nm together with electrolyte (sodium chloride). This copper complex formazan compound is particularly suitable as a water-soluble dyestuff for dyeing cellulose fiber materials and polyamide fiber materials. Strong, clear blue dyeings and prints with good depth of color and very good light- and wet-fastness properties are obtained by the customary methods of application and fixing. They are distinguished by a rapid fixing, especially in the two-phase cold pad-batch process. Of the wet-fastness properties, the fastness properties already mentioned in Example 1 for the dyestuffs therein should be singled out in particular.

EXAMPLE 3

35.6 parts of the hydrazone from phenylhydrazine-2-sulfonic acid and benzaldehyde-4-sulfonic acid are suspended in 250 parts of water of 15° to 25° C. and dissolved at a pH value of 6.5 to 7 with aqueous sodium hydroxide solution. 150 parts by volume of an aqueous copper sulfate solution containing 25 parts of crystalline copper sulfate are added, during which the pH value is kept at 4 to 6. The aqueous solution of the diazonium salt obtained from 37.7 parts of 4-β-sulfatoethylsulfonyl-2-aminophenol-6-sulfonic acid by customary diazotization is then added to this reaction solution; during the addition of the diazonium salt solution, the pH value is kept at 5.0 to 6.5 with sodium carbonate. The reaction mixture is subsequently stirred for one hour in order to bring the coupling reaction and metallization reaction to completion, and is then warmed to 40° to 60° C., stirred for a further hour ahd clarified with kieselguhr, and the copper complex formazan compound formed is precipitated by means of sodium chloride, filtered off, washed with dilute aqueous sodium chloride solution and dried at 60° C.

When written in the form of the free acid, this copper complex compound according to the invention corresponds to the general formula (1 g) given in Example 1, in which $R^1$ and $R^2$ each denote a hydrogen atom, $R^3$ denotes a sulfo group, X denotes a sulfo group and Y denotes the β-sulfatoethyl group. It has very good dyestuff properties and dyes cellulose fiber materials in reddish-tinged blue shades with good fastness properties, in particular good light-fastness properties, by the customary processes for application and fixing. $\lambda_{max}=593$ nm.

EXAMPLE 4

35.6 parts of the hydrazone from phenylhydrazine-2,5-disulfonic acid and benzaldehyde are added, together with 25 parts of crystalline copper sulfate, to the aqueous solution of the diazonium salt obtained from 39.3 parts of 1-amino-2-hydroxy-3-sulfobenzene-5-βthiosulfatoethyl-sulfone by customary diazotization. The pH value is kept at 4.5 to 6.5 with sodium carbonate. The reaction mixture is subsequently stirred for one hour in order to bring the coupling reaction and metallization reaction to completion and is then warmed to 30° to 60° C. and filtered and the copper complex formazan compound according to the invention which is formed is precipitated by means of sodium chloride, filtered off, washed with dilute aqueous sodium chloride solution and dried at 80° C.

When written in the form of the free acid, the novel copper complex compound corresponds to the general formula (1 g) given in Example 1, in which $R^2$ denotes a sulfo group, $R^1$ and $R^3$ each denote a hydrogen atom, X denotes a sulfo group and Y denotes the β-thiosulfatoethyl group.

It has very good dyestuff properties, dissolves in water giving a blue-colored solution and has similarly good advantages to those of the formazan dyestuff according to the invention which is described in Example 1 in respect of the quality of its dyeing properties and the fastness properties of the dyeings and prints produced with this dyestuff. $\lambda_{max}=598$ nm.

EXAMPLE 5

The aqueous diazonium salt solution of the diazonium salt obtained by customary diazotization of 27.9 parts of 1-amino-2-hydroxy-3-sulfobenzene-5-vinyl-sulfone and, at the same time, 100 parts by volume of an aqueous 1 molar copper sulfate solution (the diazonium salt solution and the copper sulfate solution can also be combined beforehand) are stirred into a solution, at 20° to 25° C., of 35.6 parts of the hydrazone from phenylhydrazine-2,4-disulfonic acid and benzaldehyde in 200 parts of water in the course of 5 to 10 minutes, the temperature being kept between about 5° and 20° C., preferably at 10° to 15° C., and the pH value being kept at 4.5 to 6.5 with about 19 parts of sodium carbonate. This reaction mixture is stirred at about 15° to 25° C. for about a further hour, warmed to 40° to 60° C. and filtered, and the copper complex formazan compound formed is then precipitated with sodium chloride and filtered off and the residue is washed with dilute aqueous sodium chloride solution and dried at 80° C.

A dark powder is obtained which contains the alkali metal salt (sodium salt) corresponding to a compound of the general formula (1 g) given in Example 1 in which $R^1$ denotes a sulfo group, $R^2$ and $R^3$ each denote a hydrogen atom, X denotes a sulfo group and Y denotes the vinyl group, together with electrolyte (sodium chloride). This copper complex compound has very good dyestuff properties and, in a similarly good manner to the dyestuff of Example 1, dyes cellulose fiber materials in greenish-tinged blue color shades with good fastness properties, in particular good light-fastness properties, by the application and fixing processes customary for fiber-reactive dyestuffs. $\lambda_{max}=603$ nm.

EXAMPLE 6

An aqueous solution of 35.6 parts of the hydrazone from phenylhydrazine-2,5-sulfonic acid and benzaldehyde is prepared according to Example 1, an aqueous solution of the diazonium salt from 37.7 parts of 1-amino-2-hydroxy-3-sulfobenzene-5-β-sulfatoethyl-sulfone is initially added to this solution at a temperature of up to 25° C. and at a pH value between 4.5 and 6.5, and 100 parts by volume of aqueous 1 molar copper sulfate solution are then added dropwise at a temperature of 10° to 15° C. in the course of 15 minutes; the pH value is in each case kept at 4.5 to 6.5 by means of sodium carbonate. The mixture is subsequently stirred at room temperature for one to two hours, in order to bring the coupling to completion, and is brought to a pH value of 6.8 to 7.2 with sodium carbonate.

The β-sulfatoethylsulfonyl-copper complex formazan compound according to the invention which is contained in the solution is now to be converted into the corresponding vinylsulfonyl compound. For this purpose, the solution is warmed to 50° to 55° C. and 21 parts of sodium carbonate in 76 parts of water are added in the course of 5 to 10 minutes; the pH value thereby rises to about 9.2. To bring the reaction to completion, the mixture is stirred for 30 to 40 minutes and is then brought to a pH value of 6.8 to 7.2 at a temperature of 50° to 55° C. with 20 parts by volume of approximately 17% strength aqueous hydrochloric acid.

This vinylsulfonyl compound according to the invention (analogous to that of Example 5) is now converted into the compound according to the invention containing the β-thiosulfatoethylsulfonyl group as follows: the solution is first warmed to 70° to 75° C.; 37.5 parts of sodium thiosulfate (crystalline) are added and the solution is stirred at a pH value of 5.7 to 6.2 for four hours, during which the given pH range is maintained by addition of 40 parts by volume of aqueous 50% strength acetic acid in portions. Kieselguhr is then added, the solution is clarified and 15%, based on the volume of the filtrate, of sodium chloride is added to the filtrate. The mixture is cooled, with stirring, and the compound which has precipitated is filtered off with suction and dried at 80° C.

A dark, electrolyte-containing powder is obtained, which contains the β-thiosulfatoethylsulfonyl-copper complex formazan compound (predominantly as the sodium salt) according to the invention, which is described in Example 4 and has equally good dyestuff properties; it accordingly dyes cellulose fiber materials in the same manner in deep pure blue color shades with the very good lightand wet-fastness properties mentioned in Example 4 by the application and fixing methods customary for fiberreactive dyestuffs. $\lambda_{max}=598$ nm.

EXAMPLE 7

35.6 parts of the neutral hydrazone compound from phenylhydrazine-2,5-disulfonic acid and benzaldehyde and then 25 parts of copper sulfate pentahydrate are added, in the course of 15 minutes, to a diazonium salt solution, brought to a pH value between 3 and 4, of 37.7 parts of 4-β-sulfatoethylsulfonyl-2-aminophenol-6-sulfonic acid, which has been prepared by customary diazotization in about 500 parts of aqueous solution, the pH value during the addition being kept between 4.0 and 6.0 with about 10 parts of anhydrous sodium carbonate. The mixture is subsequently stirred at room temperature for 2 to 3 hours until the coupling and coppering reaction has ended and is then clarified with kieselguhr and worked up analogously to Example 1. The copper complex formazan compound described in Example 1 and having the good dyestuff properties described therein is obtained.

EXAMPLES 8 to 90

Further copper complex formazan compounds according to the invention are described in the following tabular examples with the aid of their starting components. They can be prepared in the manner according to the invention, for example in accordance with one of the process variants described in the above embodiment examples, in an equally good yield, by reaction of a copper-donating compound and the particular starting compounds mentioned in the following examples (the arylhydrazine compound corresponding to the general formula (4), the aldehyde compound corresponding to the general formula (5) and the aminophenol compound corresponding to the general formula (3), the compounds given in the tabular examples as (A), (B) and (C) having the structure shown below). They have equally good dyeing properties and, on polyamide and polyurethane fiber materials, and especially on cellulose fiber materials, produce dyeings and prints with the color shades given in the particular tabular example, and with good fastness properties.

In the "aminophenol (3)" column of the table below, the abbreviations (A), (B) and (C) have the following meaning:

(A) is: 4-(β-sulfatoethylsulfonyl)-2-aminophenol-6-sulfonic acid
(B) is: 4-(β-sulfatoethylsulfonyl)-2-aminophenol
(C) is: 5-(β-sulfatoethylsulfonyl)-2-aminophenol.

| Example | Compounds of the general formula (1) from: | | | Color shade on cellulose ($\lambda_{max}$) |
|---|---|---|---|---|
| | Hydrazine component (4) | Aldehyde component (5) | Aminophenol (3) | |
| 8 | Phenylhydrazine-2,5-disulfonic acid | 4-chlorobenzaldehyde | (A) | reddish-tinged blue (600 nm) |
| 9 | Phenylhydrazine-2,5-disulfonic acid | 4-chlorobenzaldehyde | (B) | reddish-tinged blue (590) |
| 10 | Phenylhydrazine-2,5-disulfonic acid | 4-chlorobenzaldehyde | (C) | reddish-tinged blue (608) |
| 11 | Phenylhydrazine-2,5-disulfonic acid | 4-methylbenzaldehyde | (A) | reddish-tinged blue (604) |
| 12 | Phenylhydrazine-2,5-disulfonic acid | 4-methylbenzaldehyde | (B) | reddish-tinged blue (597) |
| 13 | Phenylhydrazine-2,5-disulfonic acid | 4-methylbenzaldehyde | (C) | reddish-tinged blue (612) |
| 14 | Phenylhydrazine-2,5-disulfonic acid | 4-methoxybenzaldehyde | (A) | greenish-tinged blue (610) |
| 15 | Phenylhydrazine-2,5-disulfonic acid | 4-methoxybenzaldehyde | (B) | greenish-tinged blue (603) |
| 16 | Phenylhydrazine-2,5-disulfonic acid | 4-methoxybenzaldehyde | (C) | greenish-tinged blue (618) |
| 17 | Phenylhydrazine-2,5-disulfonic acid | 3-methoxybenzaldehyde | (A) | reddish-tinged blue |
| 18 | Phenylhydrazine-2,5-disulfonic acid | 3-methoxybenzaldehyde | (B) | reddish-tinged blue |
| 19 | Phenylhydrazine-2,5-disulfonic acid | 3-methoxybenzaldehyde | (C) | reddish-tinged blue |
| 20 | Phenylhydrazine-2,5-disulfonic acid | 2-methoxybenzaldehyde | (A) | reddish-tinged blue (584) |
| 21 | Phenylhydrazine-2,5-disulfonic acid | 2-methoxybenzaldehyde | (B) | reddish-tinged blue (578) |
| 22 | Phenylhydrazine-2,5-disulfonic acid | 2-methoxybenzaldehyde | (C) | reddish-tinged blue (592) |
| 23 | Phenylhydrazine-2,5-disulfonic acid | 4-sulfobenzaldehyde | (A) | reddish-tinged blue (593) |
| 24 | Phenylhydrazine-2,5-disulfonic acid | 4-sulfobenzaldehyde | (B) | reddish-tinged blue (586) |
| 25 | Phenylhydrazine-2,5-disulfonic acid | 4-sulfobenzaldehyde | (C) | reddish-tinged blue (600) |
| 26 | Phenylhydrazine-2,5-disulfonic acid | benzaldehyde | (B) | reddish-tinged blue (592 nm) |
| 27 | Phenylhydrazine-2,5-disulfonic acid | 3-sulfobenzaldehyde | (A) | greenish-tinged blue (595) |
| 28 | Phenylhydrazine-2,5-disulfonic acid | 3-sulfobenzaldehyde | (B) | greenish-tinged blue (587) |
| 29 | Phenylhydrazine-2,5-disulfonic acid | 3-sulfobenzaldehyde | (C) | greenish-tinged blue (600) |
| 30 | Phenylhydrazine-2,5-disulfonic acid | 1-naphthaldehyde | (A) | greenish-tinged blue (588) |
| 31 | Phenylhydrazine-2,5-disulfonic acid | 1-naphthaldehyde | (B) | greenish-tinged blue |
| 32 | Phenylhydrazine-2,5-disulfonic acid | 1-naphthaldehyde | (C) | greenish-tinged blue |
| 33 | Phenylhydrazine-2,4-disulfonic acid | 4-chlorobenzaldehyde | (A) | greenish-tinged blue (600) |
| 34 | Phenylhydrazine-2,4-disulfonic acid | 4-chlorobenzaldehyde | (B) | greenish-tinged blue (592) |
| 35 | Phenylhydrazine-2,4-disulfonic acid | 4-chlorobenzaldehyde | (C) | greenish-tinged blue (610) |
| 36 | Phenylhydrazine-2,4-disulfonic acid | 4-methylbenzaldehyde | (A) | greenish-tinged blue (606) |
| 37 | Phenylhydrazine-2,4-disulfonic acid | 4-methylbenzaldehyde | (B) | greenish-tinged blue (598) |
| 38 | Phenylhydrazine-2,4-disulfonic acid | 4-methylbenzaldehyde | (C) | greenish-tinged blue (614) |
| 39 | Phenylhydrazine-2,4-disulfonic acid | 4-methoxybenzaldehyde | (A) | greenish-tinged blue |
| 40 | Phenylhydrazine-2,4-disulfonic acid | 4-methoxybenzaldehyde | (B) | greenish-tinged blue |
| 41 | Phenylhydrazine-2,4-disulfonic acid | 4-methoxybenzaldehyde | (C) | greenish-tinged blue |
| 42 | Phenylhydrazine-2,4-disulfonic acid | 3-methoxybenzaldehyde | (A) | greenish-tinged blue |
| 43 | Phenylhydrazine-2,4-disulfonic acid | 3-methoxybenzaldehyde | (B) | greenish-tinged blue |
| 44 | Phenylhydrazine-2,4-disulfonic acid | 3-methoxybenzaldehyde | (C) | greenish-tinged blue |
| 45 | Phenylhydrazine-2,4-disulfonic acid | 2-methoxybenzaldehyde | (A) | greenish-tinged blue |
| 46 | Phenylhydrazine-2,4-disulfonic acid | 2-methoxybenzaldehyde | (B) | greenish-tinged blue |
| 47 | Phenylhydrazine-2,4-disulfonic acid | 2-methoxybenzaldehyde | (C) | greenish-tinged blue |
| 48 | Phenylhydrazine-2,4-disulfonic acid | 4-sulfobenzaldehyde | (A) | greenish-tinged blue |
| 49 | Phenylhydrazine-2,4-disulfonic acid | 4-sulfobenzaldehyde | (B) | greenish-tinged blue |
| 50 | Phenylhydrazine-2,4-disulfonic acid | 4-sulfobenzaldehyde | (C) | greenish-tinged blue |
| 51 | Phenylhydrazine-2,4-disulfonic acid | 3-sulfobenzaldehyde | (A) | greenish-tinged blue (600 nm) |
| 52 | Phenylhydrazine-2,4-disulfonic acid | 3-sulfobenzaldehyde | (B) | greenish-tinged blue (592) |
| 53 | Phenylhydrazine-2,4-disulfonic acid | 3-sulfobenzaldehyde | (C) | greenish-tinged blue (607) |
| 54 | Phenylhydrazine-2,4-disulfonic acid | benzaldehyde | (A) | greenish-tinged blue (603) |
| 55 | Phenylhydrazine-2,4-disulfonic acid | benzaldehyde | (B) | greenish-tinged blue (596) |
| 56 | Phenylhydrazine-2,4-disulfonic acid | benzaldehyde | (C) | greenish-tinged blue (611) |
| 57 | Phenylhydrazine-2,4-disulfonic acid | 1-naphthaldehyde | (A) | greenish-tinged blue |
| 58 | Phenylhydrazine-2,4-disulfonic acid | 1-naphthaldehyde | (B) | greenish-tinged blue |
| 59 | Phenylhydrazine-2,4-disulfonic acid | 1-naphthaldehyde | (C) | greenish-tinged blue |
| 60 | Phenylhydrazine-2-sulfonic acid | benzaldehyde | (A) | reddish-tinged blue (597) |
| 61 | Phenylhydrazine-2-sulfonic acid | benzaldehyde | (B) | reddish-tinged blue (590) |
| 62 | Phenylhydrazine-2-sulfonic acid | benzaldehyde | (C) | greenish-tinged blue (603) |
| 63 | Phenylhydrazine-2-sulfonic acid | 4-sulfobenzaldehyde | (B) | reddish-tinged blue (585) |
| 64 | Phenylhydrazine-2-sulfonic acid | 4-sulfobenzaldehyde | (C) | reddish-tinged blue (599) |
| 65 | Phenylhydrazine-2-sulfonic acid | 3-sulfobenzaldehyde | (A) | greenish-tinged blue |
| 66 | Phenylhydrazine-2-sulfonic acid | 3-sulfobenzaldehyde | (B) | greenish-tinged blue (589) |
| 67 | Phenylhydrazine-2-sulfonic acid | 3-sulfobenzaldehyde | (C) | greenish-tinged blue |
| 68 | Phenylhydrazine-2-sulfonic acid | 2-sulfobenzaldehyde | (A) | reddish-tinged blue |
| 69 | Phenylhydrazine-2-sulfonic acid | 2-sulfobenzaldehyde | (B) | reddish-tinged blue |
| 70 | Phenylhydrazine-2-sulfonic acid | 2-sulfobenzaldehyde | (C) | reddish-tinged blue |
| 71 | Phenylhydrazine-2-sulfonic acid | 4-chlorobenzaldehyde | (A) | reddish-tinged blue |
| 72 | Phenylhydrazine-2-sulfonic acid | 4-methylbenzaldehyde | (A) | reddish-tinged blue |
| 73 | Phenylhydrazine-2-sulfonic acid | 4-methoxybenzaldehyde | (A) | reddish-tinged blue |
| 74 | Phenylhydrazine-2-sulfonic acid | 3-methoxybenzaldehyde | (A) | reddish-tinged blue |
| 75 | Phenylhydrazine-2-sulfonic acid | 2-methoxybenzaldehyde | (A) | reddish-tinged blue |
| 76 | Phenylhydrazine-2-sulfonic acid | 4-methylbenzaldehyde-3-sulfonic acid | (A) | reddish-tinged blue |
| 77 | Phenylhydrazine-2-sulfonic acid | 4-methylbenzaldehyde-3-sulfonic acid | (B) | reddish-tinged blue |
| 78 | Phenylhydrazine-2-sulfonic acid | 4-methylbenzaldehyde-3-sulfonic acid | (C) | reddish-tinged blue |
| 79 | Phenylhydrazine-2-sulfonic acid | 2-chlorobenzaldehyde-5-sulfonic acid | (A) | reddish-tinged blue |
| 80 | Phenylhydrazine-2-sulfonic acid | 2-chlorobenzaldehyde-5-sulfonic acid | (B) | reddish-tinged blue |
| 81 | Phenylhydrazine-2-sulfonic acid | 2-chlorobenzaldehyde-5-sulfonic acid | (C) | reddish-tinged blue |

-continued

| Example | Compounds of the general formula (1) from: Hydrazine component (4) | Aldehyde component (5) | Aminophenol (3) | Color shade on cellulose ($\lambda_{max}$) |
|---|---|---|---|---|
| 82 | Phenylhydrazine-2-sulfonic acid | 2,4-disulfobenzaldehyde | (A) | reddish-tinged blue |
| 83 | Phenylhydrazine-2-sulfonic acid | 2,4-disulfobenzaldehyde | (B) | reddish-tinged blue |
| 84 | Phenylhydrazine-2-sulfonic acid | 2,4-disulfobenzaldehyde | (C) | reddish-tinged blue |
| 85 | 4-Chlorophenylhydrazine-2-sulfonic acid | benzaldehyde-2-sulfonic acid | (B) | reddish-tinged blue |
| 86 | 4-Methoxyphenylhydrazine-2-sulfonic acid | benzaldehyde-3-sulfonic acid | (A) | greenish-tinged blue |
| 87 | 5-Hydroxyphenylhydrazine-2-sulfonic acid | benzaldehyde | (A) | greenish-tinged blue |
| 88 | 4-Nitrophenylhydrazine-2-sulfonic acid | benzaldehyde-3-sulfonic acid | (C) | bluish-tinged green |
| 89 | 4-Methylphenylhydrazine-2-sulfonic acid | benzaldehyde-4-sulfonic acid | (B) | reddish-tinged blue |
| 90 | 2-Naphthylhydrazine-1,5-disulfonic acid | benzaldehyde | (A) | greenish-tinged blue |

Use Example 1

An aqueous bath consisting of 0.25 part by volume of 60% strength aqueous acetic acid, 0.15 part of a commercially available leveling auxiliary for wool and 0.3 part of ammonium sulfate in 400 parts of water is prepared for the purpose of dyeing 10 parts of a woollen yarn. The wool is thoroughly wetted in the bath at a temperature of 30°–40° C. and a pH value of the bath of 5-5.2. A solution of 0.2 part of the vinylsulfonyl/copper complex formazan dyestuff from Example 6 in 20 parts of water is then added to the bath, with stirring. The wool is further agitated therein, the temperature is kept at 30° to 40° C. for 5 minutes, the dyebath is then heated to 85° C. in the course of 40 minutes, dyeing is continued at this temperature for 10 minutes and the dyebath is then heated to the boiling point in the course of 10 minutes. Dyeing is continued at the boil for 1 hour. The bath is then cooled to 80° C. The dyestuff used has been absorbed on the wool very well. After-treatment of the dyed woollen yarn can therefore be carried out in the same bath. Ammonia is added until the pH value is 8–8.5 and the material is treated at this pH and at a temperature of 80° C. for 15 minutes. It is removed, rinsed with warm and cold water and dried. A deep blue dyeing with very good light- and wet-fastness properties is obtained.

Use Example 2

An aqueous padding liquor containing, per liter, 40 g of the dyestuff from Example 1, 100 g of urea, 30 g of anhydrous sodium sulfate and 16 parts by volume of aqueous 32.5% strength sodium hydroxide solution is prepared for dyeing a cotton fabric. The cotton fabric is padded at room temperature with a liquor pick-up of 80% of the weight of the cotton fabric, wound up onto a beam, wrapped in plastic film and left to stand at room temperature for 24 hours. During this time, the dyestuff is fixed. After soaping and rinsing in the customary manner, a deep, brilliant blue dyeing which has the good fastness properties during use and manufacturing processes, as mentioned in Example 1, is obtained on the cotton fabric.

Use Example 3

An aqueous dyebath containing 5 parts of the dyestuff from Example 26, 10 parts of anhydrous sodium sulfate, 10 parts of anhydrous sodium carbonate and 4 parts by volume of 32.5% strength aqueous sodium hydroxide solution dissolved in 2,000 parts by volume is prepared for dyeing a cotton fabric. 100 parts of a cotton fabric are introduced into this dyebath and are dyed at a temperature of 40° C. for between 60 and 90 minutes. After soaping and rinsing in the customary manner, a deep, brilliant blue dyeing with the very good fastness properties during use and manufacturing processes, as mentioned in the description, is obtained.

Use Example 4

A printing paste containing, per 1,000 parts, 30 parts of the dyestuff from Example 1, 50 parts of urea, 375 parts of water, 500 parts of a neutral 4% strength aqueous alginate thickener, 15 parts of sodium bicarbonate and 10 parts of the sodium salt of m-nitrobenzoic acid is used for printing a mercerized cotton fabric. The cotton fabric is printed with this printing paste in the customary manner and, after drying, is steamed for 10 to 15 minutes with steam of 101° to 103° C. After this fixing operation, the fabric is finished in the customary manner by rinsing with cold and warm water, by soaping at the boiling point and by renewed rinsing with water and subsequent drying. A deep, brilliant blue print which has the very good light- and wet-fastness properties mentioned in Example 1 is obtained.

Use Example 5

30 parts of the dyestuff from Example 1 are dissolved in 200 parts of water of 70° C.; this solution is stirred into 500 parts of a neutral or weakly acid, 4% strength alginate thickener. This thickened dyestuff solution is made up to 1,000 parts with 270 parts of water. A mercerized cotton fabric is printed in the customary manner with the printing paste thus prepared and is then dried and, for fixing of the dyestuff, is passed through an aqueous fixing bath heated at 90° to 105° C. and containing 100 parts of sodium chloride, 150 parts of anhydrous sodium carbonate, 50 parts of anhydrous potassium carbonate and 70 parts by volume of 33% strength aqueous sodium hydroxide solution in 1,000 parts of water. Fixing is already effected here within a few seconds, so that the printed fabric can be passed through very rapidly. After this fixing treatment, the fabric is finished in the customary manner by rinsing with cold water and by hot washing, renewed rinsing with water and drying. A level, blue printed pattern with the very good light- and wet-fastness properties mentioned in Example 1 is obtained.

Use Example 6

40 parts of the dyestuff from Example 1 are dissolved in 200 parts of water of 70° C.; this solution is stirred into 500 parts of a neutral or weakly acid, 4% strength alginate thickener. This thickened dyestuff solution is made up to 1,000 parts with 260 parts of water. A mercerized cotton fabric is printed in the customary manner with the printing paste thus prepared and is then dried and, for fixing of the dyestuff, padded with a padding liquor consisting of 100 parts of sodium carbonate, 100 parts of sodium chloride, 100 parts of potassium carbonate, 100 parts by volume of sodium hydroxide solution of Be strength 38° and 600 parts of water at room temperature with a liquor pick-up of about 60 to 70% of the weight of the cotton fabric. Fixing is already effected after a residence time of 5 to 10 minutes in air. After this fixing treatment, the fabric is finished in the customary manner by rinsing with cold water and by hot washing, renewed rinsing with water and drying. A level, blue printed pattern with very good light- and wet-fastness properties is obtained.

Use Example 7

If one of the procedures described above is followed in accordance with the present invention for dyeing and printing wool or synthetic polyamide materials or cellulose fiber materials, for example analogously to the above Use Examples 1 to 6, and one of the copper complex formazan dyestuffs according to the invention described in the other previous embodiment examples or the subsequent tabular examples is used, according to the invention, as the dyestuff here, equally strong dyeings and prints with good fastness properties and the color shades given for these dyestuffs are obtained.

What is claimed is:

1. A copper complex formazan compound of the formula

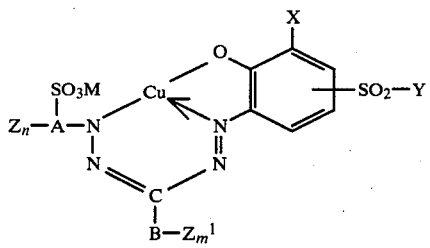

in which:

A is the benzene or naphthalene ring, both of which are necessarily substituted by the indicated sulfo group —SO$_3$M (where M has the meaning given below) in the ortho-position relative to the N-atom of the hydrazone component, and both of which are, a part from the indicated groups —SO$_3$M and Z, unsubstituted or substituted by one to three substituents selected from the group consisting of halogen, nitro, alkyl of 1 to 5 C-atoms, lower alkylaminoalkyl, alkoxy of 1 to 4 C-atoms, hydroxy, alkylsulfonyl of 1 to 4 C-atoms, phenylsulfonyl, sulfamoyl, N-mono-alkylsulfamoyl with an alkyl of 1 to 4 C-atoms, N,N-dialkylsulfamoyl with alkyls of 1 to 4 C-atoms, lower alkanoylamino, aroylamino, N-monoalkylamino with an alkyl of 1 to 4 C-atoms, N,N-dialkylamino with alkyls of 1 to 4 C-atoms, phenyl and phenylsulfamoyl;

B is phenyl or a naphthyl, each of which is unsubstituted or substituted by substituents selected from the group consisting of hydroxy, nitro, halogen, alkyl of 1 to 5 C-atoms, alkoxy of 1 to 4 C-atoms, carbalkoxy of 2 to 5 C-atoms, amino, N-mono-alkylamino with an alkyl of 1 to 4 C-atoms, N,N-di-alkylamino with alkyls of 1 to 4 C-atoms and phenylsulfamoyl, or B is the monovalent radical of the furan, thiophene, pyrrole, imidazole, pyrazole, pyridine, quinoline or benzimidazole, unsubstituted or substituted by substituents selected from the group consisting of lower alkyl, lower alkoxy, chlorine, benzyl, phenethyl and phenyl, or B is hydrogen, carboxy, cyano or nitro or a straight-chain or branched alkyl group of 1 to 8 C-atoms or a straight-chain or branched alkenyl of 2 to 8 C-atoms, these alkyl and alkenyl are unsubstituted or substituted by phenyl or phenyl substituted by substituents selected from the group consisting of methyl, ethyl, methoxy, ethoxy, fluorine, chlorine, bromine and sulfamoyl;

M is hydrogen or the equivalent of an alkali or alkaline earth metal;

X is hydrogen or sulfo;

m is 1 or 2;

n is 1 or 2;

Z is hydrogen or a group which confers water-solubility, one or both of which—besides the sulfo group necessarily required in the ortho-position relative to the N-atom of the hydrazone component A—are bonded to A on an aliphatic or aromatic carbon atom of A, preferably on an aromatic nucleus;

Z$^1$ is hydrogen or a group which confers water-solubility, one or both of which are bonded to B on an aliphatic or aromatic carbon atom of B, preferably on an aromatic nucleus;

Z and Z$^1$ together denoting not more than three sulfo groups, if X is a sulfo group;

Y is vinyl or a group of the formula —CH$_2$—CH$_2$—E, in which E is a substituent which can be eliminated under alkaline conditions.

2. A copper complex formazan compound according to claim 1, wherein:

A is the benzene ring which is, besides the indicated groups —SO$_3$M and Z, unsubstituted or substituted by one substituent selected from the group consisting of chlorine, bromine, nitro, methyl, ethyl, methoxy, ethoxy and carboxy, B is phenyl unsubstituted or substituted by 1 or 2 substituents selected from the group consisting of chlorine, methyl, methoxy, ethoxy, carboxy and nitro, Z has the meaning given in claim 1 and is bonded to A in the m- or p-position relative to the N-atom of the hydrazone component, Z$^1$ has the meaning given in claim 1 and is bonded to B in the m- or p-position relative to the carbon atom of the aldehyde component, and Y is vinyl or β-sulfatoethyl, the group —SO$_2$—Y being bonded to the benzene ring in the meta-position relative to X if X is sulfo or hydrogen, and in the ortho-position relative to X if X is hydrogen.

3. A copper complex formazan compound according to claim 1, wherein A is a benzene ring, B is phenyl unsubstituted or substituted by one methyl, methoxy, ethoxy or chlorine, m and n each are 1, Z is sulfo, and Z$^1$ is hydrogen or sulfo.

4. A copper complex formazan compound according to claim 1, of the formula

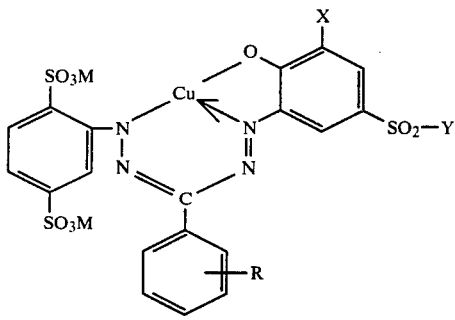

in which M is defined as in claim 1, X is hydrogen or sulfo, Y is vinyl or β-sulfatoethyl, and R is hydrogen, methyl, ethyl, methoxy, ethoxy, chlorine or sulfo, R being bonded to the benzene ring in the p-position or, if R is sulfo, in the p- or m-position.

5. A copper complex formazan compound according to claim 1, of the formula

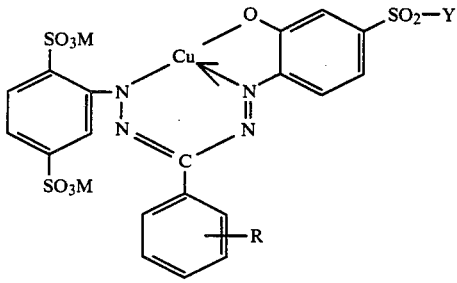

in which M is defined as in claim 1, X is hydrogen or sulfo, Y is vinyl or β-sulfatoethyl, and R is hydrogen, methyl, ethyl, methoxy, ethoxy, chlorine or sulfo, R being bonded to the benzene ring in the p-position or, if R is sulfo, in the p- or m-position.

6. A copper complex formazan compound according to claim 1, of the formula

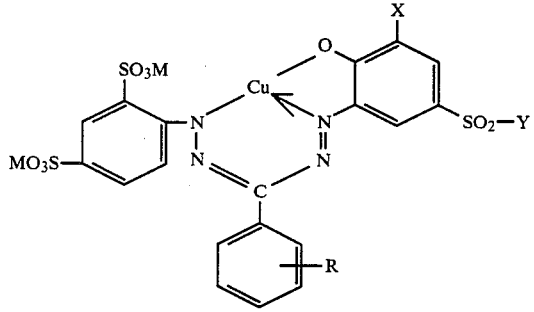

in which M is defined as in claim 1, X is hydrogen or sulfo, Y is vinyl or β-sulfatoethyl, and R is hydrogen, methyl, ethyl, methoxy, ethoxy, chlorine, sulfo, R being bonded to the benzene ring in the p-position or, if R is sulfo, in the p- or m-position.

7. A copper complex formazan compound according to claim 1, of the formula

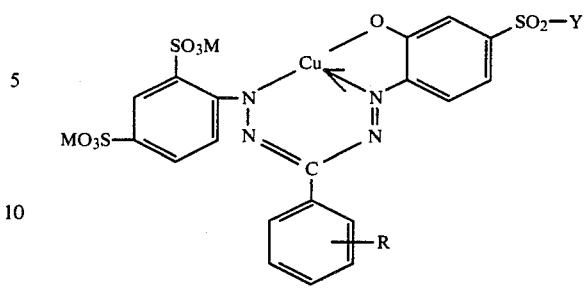

in which M is defined as in claim 1, X is hydrogen or sulfo, Y is vinyl or β-sulfatoethyl, and R is hydrogen, methyl, ethyl, methoxy, ethoxy, chlorine or sulfo, R being bonded to the benzene ring in the p-position or, if R is sulfo, in the p- or m-position.

8. A copper complex formazan compound according to claim 1, of the formula

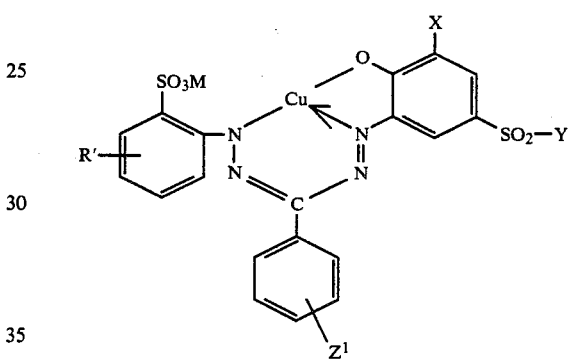

in which M is defined as in claim 1, X is hydrogen or sulfo, Y is vinyl or β-sulfatoethyl, R' is hydrogen, chlorine, methyl, ethyl, methoxy or ethoxy, and $Z^1$ is sulfo bonded in the p- or m-position.

9. A copper complex formazan compound according to claim 1, of the formula

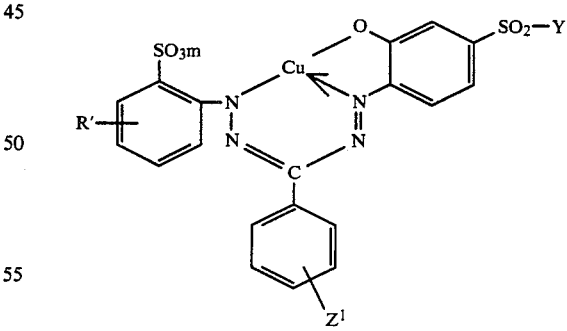

in which M is defined as in claim 1, X is hydrogen or sulfo, Y is vinyl or β-sulfatoethyl, R' is hydrogen, chlorine, methyl, ethyl, methoxy or ethoxy, and $Z^1$ is sulfo bonded in the p- or m-position.

10. A copper complex formazan compound according to claim 1, wherein the group —$SO_2$—Y is bonded to the benzene ring in the m-position relative to X if X represents a sulfo group or a hydrogen atom, and is bonded in the orthoposition relative to X if X represents a hydrogen atom.

11. A copper complex formazan compound according to claim 1, wherein Z is sulfo and n is 1.

12. A copper complex formazan compound according to claim 1, wherein $Z^1$ is sulfo and m is 1.

13. A copper complex formazan compound according to claim 1, wherein A is the benzene ring.

14. A copper complex formazan compound according to claim 1, wherein A is a naphthalene ring.

15. A copper complex formazan compound according to claim 1, wherein Y is vinyl or a group of the formula —$CH_2$—$CH_2$—E, in which E is halogen, lower alkanoyloxy, phosphato, thiosulfato or sulfato.

16. A copper complex formazan compound according to claim 1, wherein Y is vinyl or β-sulfatoethyl.

17. A copper complex formazan compound according to claim 4 wherein X is sulfo.

18. A copper complex formazan compound according to claim 6 wherein X is sulfo.

19. A copper complex formazan compound according to claim 17, wherein R is hydrogen, methyl, chlorine or sulfo.

20. A compound according to claim 1, of the formula

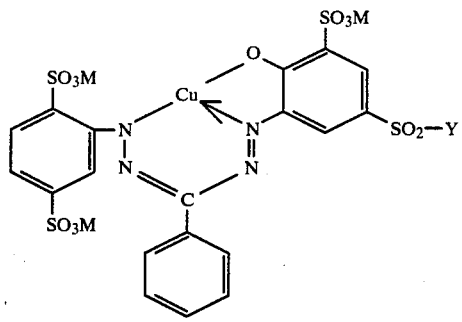

in which M is hydrogen or an alkali metal and Y has the meaning given in claim 1.

* * * * *

UNITED STATES PATENT AND TRADEMARK OFFICE
CERTIFICATE OF CORRECTION

PATENT NO. : 4,607,098
DATED : August 19, 1986
INVENTOR(S) : GUNTER SCHWAIGER

It is certified that error appears in the above-identified patent and that said Letters Patent is hereby corrected as shown below:

In claim 1, col. 21, for the words "a part" read -- apart --.

In claim 5, column 23, lines 38 and 39; in claim 7, column 24, lines 15 and 16; and in claim 9, column 24, lines 59 and 60, delete "X is hydrogen or sulfo,".

In claim 9, column 24, line 46, in the structural formula, for "$SO_3m$" read -- $SO_3M$ --.

Signed and Sealed this

Eighth Day of September, 1987

Attest:

DONALD J. QUIGG

Attesting Officer     Commissioner of Patents and Trademarks